Patented Jan. 22, 1935

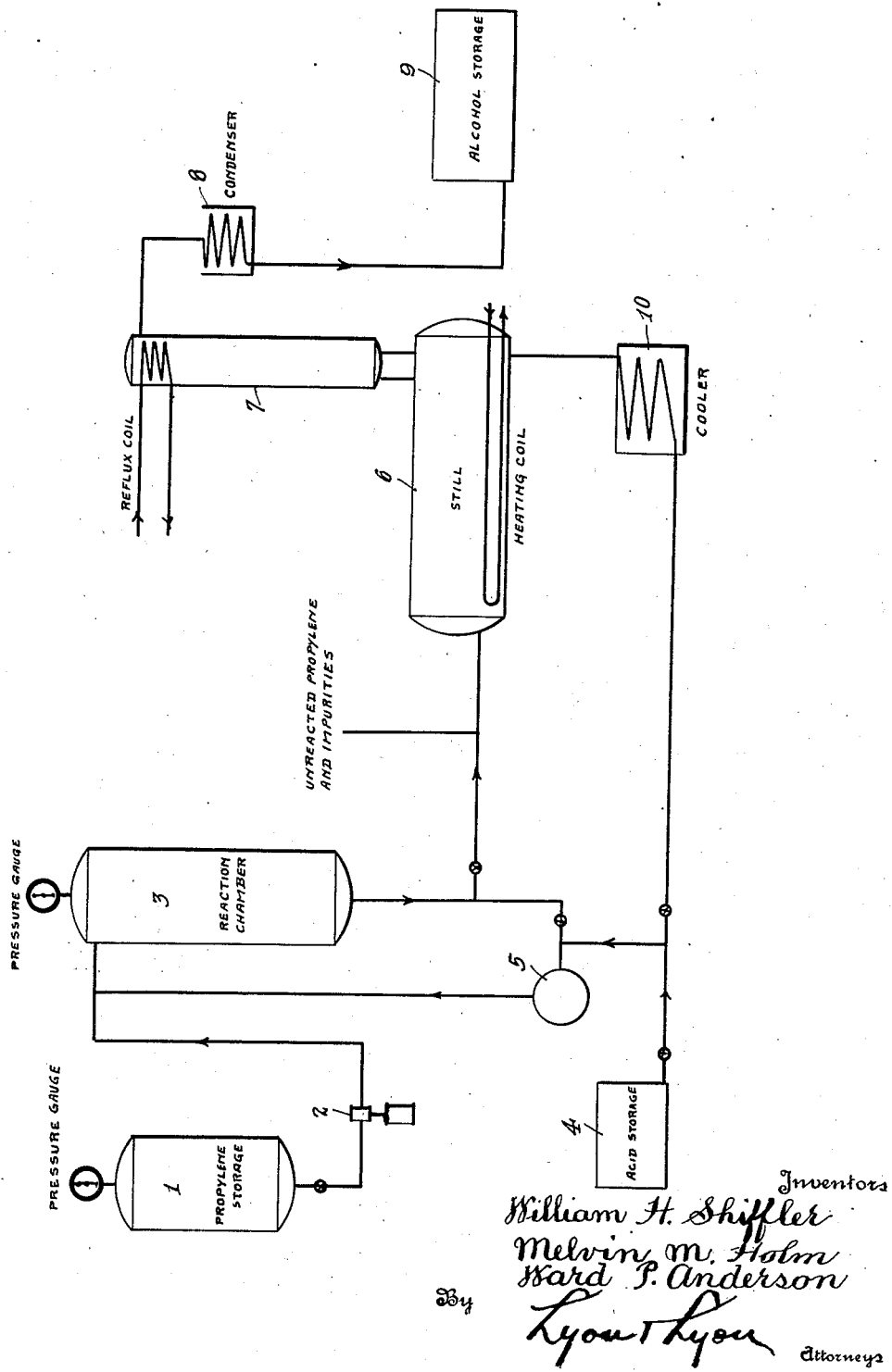

1,988,611

UNITED STATES PATENT OFFICE 1,988,611

PROCESS FOR PRODUCING ISOPROPYL ALCOHOL FROM PROPYLENE

William H. Shiffler and Melvin M. Holm, Berkeley, and Ward P. Anderson, Richmond, Calif., assignors to Standard Oil Company of California, San Francisco, Calif., a corporation of Delaware Application August 22, 1930, Serial No. 477,148

9 Claims. (Cl. 260—156)

This invention relates to a process for producing isopropyl alcohol from propylene.

The processes heretofore proposed for the manufacture of isopropyl alcohol from propylene or from gases containing it make use of sulfuric acid of high concentration, i.e. 87% to 100% $H_2SO_4$. Propylene combines with sulfuric acid to form isopropyl sulfuric acid. Upon hydrolysis this acid ester produces isopropyl alcohol and sulfuric acid in dilute solution. These reactions may be shown as follows:

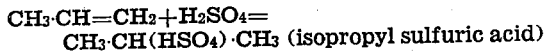

$CH_3 \cdot CH=CH_2 + H_2SO_4 =$
$CH_3 \cdot CH(HSO_4) \cdot CH_3$ (isopropyl sulfuric acid)

$CH_3 \cdot CH(HSO_4) \cdot CH_3 + H_2O =$
$H_2SO_4 + CH_3 \cdot CHOH \cdot CH_3$ (isopropyl alcohol)

The isopropyl alcohol may be separated from the dilute sulfuric acid solution by distillation. A very considerable percentage of the propylene reacted upon by sulfuric acid of these concentrations is not converted to isopropyl alcohol but is polymerized to oily hydrocarbons of high boiling point. The formation of such hydrocarbon polymers amounts to 20% to 50% or more by weight of the propylene reacted upon, depending upon the acid concentration and temperature and to a less extent the length of time of the reaction. In order to minimize these polymerization losses the reaction is very often carried out at reduced temperatures without, however, eliminating the formation of such polymers.

The use of acids at high concentrations requires considerable dilution for the hydrolysis of the alkyl sulfuric acid. It follows, therefore, that a reconcentration of acid is required for the re-use of the acid as absorbent. This operation is not only costly by reason of the equipment and fuel cost involved, but also the non-volatile materials, which have been absorbed by the acid, carbonize when the acid is concentrated causing the acid to foam and materially increase the cost of the concentration operation.

It has not been possible heretofore to use sulfuric acid of strengths lower than, say, 87% for two reasons: first, the rate of absorption of gaseous propylene in dilute acid is too low to permit practical commercial utilization of the process; second, the absorption capacity of gaseous propylene in dilute acids is very low, thus requiring prohibitive amounts of acid and absorption vessels of prohibitive size for carrying out the absorption.

It is the general object of the present invention to provide a process for producing isopropyl alcohol from propylene or from hydrocarbon materials containing it without incurring the losses due to polymerization which have characterized the prior processes.

It is a further object of the present invention to provide a process for producing isopropyl alcohol which may utilize sulfuric acid of sufficiently low strength as to eliminate to a large extent the cost of concentrating the acid and to eliminate the carbonization and decomposition of the acid which occur when the acids are attempted to be concentrated to produce strong sulfuric acids.

We have discovered that when propylene or vapors containing propylene are placed under sufficient pressure to reduce the same to a liquid state and then contacted with sulfuric acid, acids of strengths less than 85% may be used. It appears that when reduced to a liquid state propylene is readily absorbed by comparatively weak acids. As a result of using weak acids, it is found that the polymerization of the propylene by the acid is substantially completely eliminated. Moreover, when weak acids, such as acids less than 85% strength, are used, re-concentration of the acid as a separate and distinct step in the process is unnecessary and even in cases where it is found desirable the cost of re-concentration is minimized because of the fact that the expensive concentration of sulfuric acid and the decomposition of sulfuric acid takes place mainly when it is attempted to concentrate the acid to strengths in excess of 85%.

The significance of these results is obvious. The elimination of the formation of polymers allows a practically complete conversion to alcohol of the propylene reacted upon by the acid. Since it is commercially advantageous to treat, whether by this or by any other process, material which has already undergone a purification from hydrocarbons either more reactive toward sulfuric acid under the conditions chosen (such as the butenes, for example) or of greatly higher vapor pressure than propylene (such as methane, ethane and ethylene, for example), a lesser amount of the raw material need be so purified or separated per unit quantity of alcohol ultimately produced; yields and production rates are higher; and total capital investment is lower. The elimination of the necessity of re-concentrating the acid carries with it very obvious advantages: costly equipment is done away with; a fuel economy of no small magnitude is accomplished; and the carbonization of the acid is minimized, being brought about only very slowly at the temperatures of the alcohol distillation.

The present invention together with various objects and advantages thereof will best be understood from a description of one or more preferred examples of the process embodying the invention. For this purpose, we have hereinafter described a number of preferred examples of the process as the process may be carried out in the apparatus illustrated in the accompanying drawing.

In the drawing the figure is a diagrammatic view of the apparatus.

One method of carrying out this process may be described as follows: 70 percent sulfuric acid is pumped from storage tank 4 with circulating pump 5 to reaction chamber 3. Liquid propylene is pumped from storage tank 1 to reaction chamber 3 through transfer pump 2. The liquid propylene and acid are thoroughly mixed by the pump 5 which takes suction from the bottom of the reaction chamber and discharges back into the reaction chamber at or near its top. The reaction chamber is lead-lined and may, although it is not necessary under all conditions, be provided with a water cooling jacket or internal coils to keep the temperature below about 120° F.

This operation is continued until analysis of gas released from the reaction chamber shows that a satisfactory amount of propylene has reacted with the acid. The time required for the propylene to react with the acid will be reduced by increasing the acid strength, the circulating rate, the temperature, and the purity of the propylene charged. When the acid strength or the temperature is increased beyond certain limits, oils (polymers) are formed instead of alcohol. The temperature rises somewhat during the progress of the reaction. This should be controlled, by any ordinary means, so that 120° F. is not exceeded. The acid layer is drawn from the reaction chamber to the lead-lined still 6 where sufficient water is added to reduce the acid strength to, say, 50% $H_2SO_4$. The temperature of the still is raised by any suitable means, such as internal steam coils, and alcohol and water distilled off; the vapors are condensed in condenser 8 and pass to the alcohol storage tank 9. The concentration of the acid to its original strength, in this case 70 percent, is accomplished during or after the distillation of the alcohol, and is brought about by removal of water,—first, through the hydration to isopropyl alcohol, and second, by the removal of some free water during the distillation. The amount of such free water removed may, of course, be regulated by refluxing in the column 7, if it is so desired.

The strength of the alcohol recovered in the storage tank 9 depends on the amount of water removed during the distillation. Some propylene is formed during the distillation by decomposition of alcohol, the amount depending on the still temperature and acid strength. If necessary or desirable this propylene may be recovered in a suitable recovery system.

The pressure under which the liquid propylene storage and the reaction chamber 3 are held will depend, of course, upon the exact nature of the materials to be treated. If the material to be treated consists substantially of the mixture propylene-propane, the pressure will be about 125 pounds gauge at atmospheric temperature (70° F.); if the liquid contains impurities such as methane, ethane or ethylene, this pressure may be considerably higher. Pressures above those necessary to hold the propylene in liquefied form are of no benefit in the carrying out of the process; it is obviously advantageous, however, to effect a separation of the lower-boiling constituents from the hydrocarbon materials to be treated, if only to reduce the pressures necessary to liquefy the propylene.

The sulfuric acid used may be from 50 to 85 percent $H_2SO_4$ but is preferably about 70 percent. Acid of strength less than 70 percent requires a longer period of contacting for absorption of the propylene; acid of above 85 percent $H_2SO_4$, at ordinary temperatures, causes a material polymerization to oils. The effect of the strength of the acid upon the rate of absorption of propylene may be shown by the following examples:

*Example 1.*—61 gallons of 71.3 percent $H_2SO_4$ were charged to the reaction chamber 3. 77 gallons of a liquefied mixture consisting of 52.8 percent propylene and 47.2 other liquefied hydrocarbons, chiefly propane, were added from the storage chamber 1. After two hours circulation an analysis of the liquid unabsorbed by the acid showed a reduction in propylene content to 9.5 percent. This analysis, of course, may be carried out on the gases or vapors existing above the reaction mixture, since they are in equilibrium with it. 91 percent of the propylene had, therefore, been reacted upon by the acid. Upon reduction to atmospheric pressure the propane and unreacted propylene evaporated from the acid absorption products; no oily polymers remained.

*Example 2.*—In another case 80 gallons of 67.8 percent acid were agitated with 100.5 gallons of a liquid hydrocarbon mixture consisting of 55 percent propylene. The agitation was carried out under identical conditions as in Example 1. After 4.5 hours the propylene content of the remaining hydrocarbon mixture was 16.0 percent. In this case, therefore, 84 percent of the propylene was reacted upon in 4.5 hours. No oily polymers were formed.

*Example 3.*—Under similar conditions 65.5 per cent acid caused a reduction in propylene content of from 55 per cent to 37 per cent, in 5 hours. Thus in this length of time only 52 per cent absorption had been accomplished by the weaker acid.

The agitation brought about in the above three examples was in all cases similar. It will be understood, of course, that this agitation may be achieved in other ways than by the centrifugal pump and circulating system described above; this is merely very efficient, and the power cost is low.

In a measure, strength of acid and temperature are reciprocal factors in causing polymerization of the propylene; for example, with the stronger acids used in this process, the temperature should be below about 120° F., while with the weaker acids somewhat higher temperatures may be used; in general, acids stronger than about 85 percent $H_2SO_4$ are to be avoided, due to excessive polymerization. The acid reaction mixture is preferably diluted with water in amount sufficient to reduce the acid strength to 70 percent or less, on an alcohol-free basis, before distillation, in order to avoid excessive decomposition in the still. Obviously this need not be done if the weaker acids are used in the original absorption or reaction. Some isopropyl ether is formed during the alcohol distillation; this may be separated by fractional condensation during the progress of the alcohol distillation itself.

The relative amounts of ether and of alcohol produced may be varied by varying the strength of the acid present in the distillation step, stronger acids tending toward greater ether formation than weaker acids.

While the process and apparatus herein described are well adapted for carrying out the various objects and advantages of the present invention, it is to be understood that we do not wish to be limited to the particular embodiment set forth, and the invention is of the scope of the appended claims.

We claim:

1. The process which comprises reacting propylene in the liquid phase with sulphuric acid of a concentration adapted to produce sulfates of propylene.

2. A process for producing isopropyl alcohol from propylene which comprises bringing sulfuric acid of a strength greater than 50 percent but less than 85 percent by weight into contact with propylene in the liquid state and distilling the product.

3. A process for producing isopropyl alcohol from propylene which comprises bringing sulfuric acid of a strength greater than 50 percent but less than 85 percent by weight into contact with propylene in the liquid state, diluting the acid reactive mixture with water and distilling the product.

4. The process which comprises reacting propylene in liquid phase with sulphuric acid of a concentration adapted to produce sulphates of propylene, in which the reaction is carried out at temperatures lower than 120° F.

5. A process of making an acid absorption product capable of hydrolysis into isopropyl alcohol which consists in contacting propylene in the liquid state with sulfuric acid of a strength greater than 50 percent but less than 85 percent by weight.

6. A process of producing isopropyl alcohol from propylene which comprises, bringing sulfuric acid of a strength greater than 50% but less than 85% by weight into contact with propylene in liquid state until most of the propylene has been absorbed by the acid, diluting the acid reaction mixture with water, and distilling isopropyl alcohol from the diluted acid reaction mixture while reconcentrating the sulfuric acid during this operation to its original strength.

7. A process for producing isopropyl alcohol from propylene which comprises, bringing sulphuric acid of a strength greater than 50% but less than 85% by weight into contact with propylene in the liquid state and at temperatures below 120° F., and distilling isopropyl alcohol from the sulphuric acid absorption product.

8. A process for producing isopropyl alcohol from propylene which comprises, bringing sulphuric acid of a strength greater than 50% but less than 85% by weight into contact with propylene in the liquid state and at temperatures below 120° F., and distilling isopropyl alcohol from the sulphuric acid absorption product, and simultaneously distilling isopropyl ether.

9. A process for producing isopropyl alcohol from propylene which comprises bringing sulfuric acid of a strength of 65 to 85 percent by weight into contact with propylene in the liquid state, diluting the acid reaction mixture with water and distilling the product.

WILLIAM H. SHIFFLER.
MELVIN M. HOLM.
WARD P. ANDERSON.